US006810367B2

(12) United States Patent
Barnard (10) Patent No.: US 6,810,367 B2
(45) Date of Patent: Oct. 26, 2004

(54) METHOD AND APPARATUS FOR RESPONDING TO THRESHOLD EVENTS FROM HETEROGENEOUS MEASUREMENT SOURCES

(75) Inventor: David L. Barnard, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 145 days.

(21) Appl. No.: 10/214,309

(22) Filed: Aug. 8, 2002

(65) Prior Publication Data

US 2004/0030537 A1 Feb. 12, 2004

(51) Int. Cl.[7] .................... G06F 19/00; G06F 15/177
(52) U.S. Cl. .................... 702/193; 709/223; 709/224
(58) Field of Search ................... 702/189, 194, 702/198, 193; 709/223, 224

(56) References Cited

U.S. PATENT DOCUMENTS

| | | | | |
|---|---|---|---|---|
| 5,751,964 A | * | 5/1998 | Ordanic et al. | 709/224 |
| 6,633,230 B2 | * | 10/2003 | Grandin et al. | 340/506 |
| 2002/0013841 A1 | * | 1/2002 | Schweitzer et al. | 709/224 |
| 2002/0013843 A1 | * | 1/2002 | Schweitzer et al. | 709/224 |
| 2002/0165957 A1 | * | 11/2002 | Devoe et al. | 709/224 |
| 2003/0110250 A1 | * | 6/2003 | Schnitzer et al. | 709/224 |
| 2003/0126254 A1 | * | 7/2003 | Cruickshank et al. | 709/224 |
| 2003/0126255 A1 | * | 7/2003 | Rice et al. | 709/224 |
| 2003/0126256 A1 | * | 7/2003 | Cruickshank et al. | 709/224 |
| 2003/0204781 A1 | * | 10/2003 | Peebles et al. | 714/25 |
| 2003/0204789 A1 | * | 10/2003 | Peebles et al. | 714/47 |

* cited by examiner

Primary Examiner—Patrick J Assouad (57) ABSTRACT

A system is disclosed that collects heterogeneous scalar measurement data over a network from a plurality of devices connected to the network, and automatically normalizes the collected heterogeneous scalar measurement data based on a threshold to generate an event based on a threshold crossing. In an embodiment, the system automatically derives a measurement from the collected heterogeneous scalar measurement data; and automatically scales the derived measurement or the collected heterogeneous scalar measurement data. In another embodiment, the system normalizes the collected heterogeneous scalar measurement data, the scaled derived measurement, the scaled collected heterogeneous scalar measurement data, or the derived measurement.

20 Claims, 5 Drawing Sheets

METHOD AND APPARATUS FOR RESPONDING TO THRESHOLD EVENTS FROM HETEROGENEOUS MEASUREMENT SOURCES

BACKGROUND OF THE INVENTION

1. Field of the Invention

The present invention relates to responding to threshold events from heterogeneous measurement sources on a network.

2. Description of the Related Art

Network administrators need to be able to get measurements from devices on a network. Examples of devices from which measurements may need to be taken include, for example, routers, switches, servers, clients, PCs, telecommunications equipment, voice gateways, etc. Network administrators sometimes need to set thresholds and determine whether scalar measurements from monitored network devices cross those thresholds. For example, a network administrator may want to be alerted when usage exceeds 80% of network capacity. When dealing only with network devices that are controlled by one protocol, for example, SNMP, setting such thresholds and being alerted when they are violated is well known in the art.

However, multiple other protocols exist, such as XML and CMIP, that are also used to monitor network devices in some networks. Scalar measurement data from a plurality of network devices that are not all monitored using the same protocol is heterogeneous as to its source. In networks containing network devices that are controlled by heterogeneous protocols, network administrators are required to individually set thresholds for each distinct protocol, monitor the network devices controlled by that protocol, and generate threshold events accordingly. In some instances, network administrators create individualized ad hoc solutions. For example, in a network containing CMIP and SNMP protocols, a CMIP management system can be set up with a gateway to receive SNMP data. The gateway then changes the SNMP data into CMIP data. However, each such solution must be individually designed, tested, and implemented. Such individual design, testing, and implementation occupies valuable time and resources. A need exists for a universal data model that is able to set a common threshold for the heterogeneous scalar measurement data and to respond to common threshold events in networks that monitor heterogeneous network devices.

SUMMARY OF THE INVENTION

The present invention provides a universal data model that is able to set a common threshold for heterogeneous scalar measurement data and to respond to common threshold events in networks that monitor heterogeneous network devices.

The present invention provides a system that collects heterogeneous scalar measurement data over a network from a plurality of devices connected to the network, and automatically normalizes the collected heterogeneous scalar measurement data based on a threshold to generate an event based on a threshold crossing. In an embodiment, the system automatically derives a measurement from the collected heterogeneous scalar measurement data, and automatically scales the derived measurement or the collected heterogeneous scalar measurement data. In another embodiment, the system normalizes the collected heterogeneous scalar measurement data, the scaled derived measurement, the scaled collected heterogeneous scalar measurement data, or the derived measurement.

The present invention provides a system that includes a plurality of data collectors to collect heterogeneous scalar measurement data from a plurality of network devices. The system also includes a derivation unit to derive a measurement from the collected heterogeneous scalar measurement data. The system further includes a scaling unit to scale the derived measurement or the collected heterogeneous scalar measurement data. The system also includes a normalization unit to normalize the scaled derived measurement, the scaled collected heterogeneous scalar measurement data, the derived measurement, or the collected heterogeneous scalar measurement data, based on a threshold. The system further includes an event generation unit to generate an event based on the normalized data when the threshold is crossed.

These together with other advantages that will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Network devices may be controlled via different protocols, e.g., SNMP, XML, CMIP, http, Corba, IEEE-488, IDL, TL1, SCPI, ASCII, etc. The term "heterogeneous" is defined as "different in kind; unlike; incongruous." Random House Webster's Unabridged Dictionary 897 ($2^{nd}$ ed. 1998). Scalar measurement data taken from a plurality of network devices controlled via different protocols is heterogeneous, for example, as to its source as well as, for example, type of value (e.g., floating point, integer, signed, unsigned, etc.), scale (e.g., truncated, positive, negative, variable, etc.), and/or time scale (e.g., intervalized, asynchronous, etc.).

The present invention allows network administrators to set a common threshold for heterogeneous scalar measurement data, to determine if the heterogeneous scalar measurement data crosses the threshold, and to react accordingly.

For example, if a network contains a PC and several heterogeneous network devices, e.g., one being a router, and the router contains a counter that is available by SNMP to count how many packets go through the router, a network administrator may want to monitor the rate of packet flow through the router. If too many packets per second are flowing through the router, the network may become congested. The network administrator would need to gather the SNMP data, process the data, and determine whether a threshold was exceeded (i.e., too many packets per second). If the threshold was exceeded, an event is generated that can, for example, be displayed on an event viewer to notify the network administrator.

Figure 1:
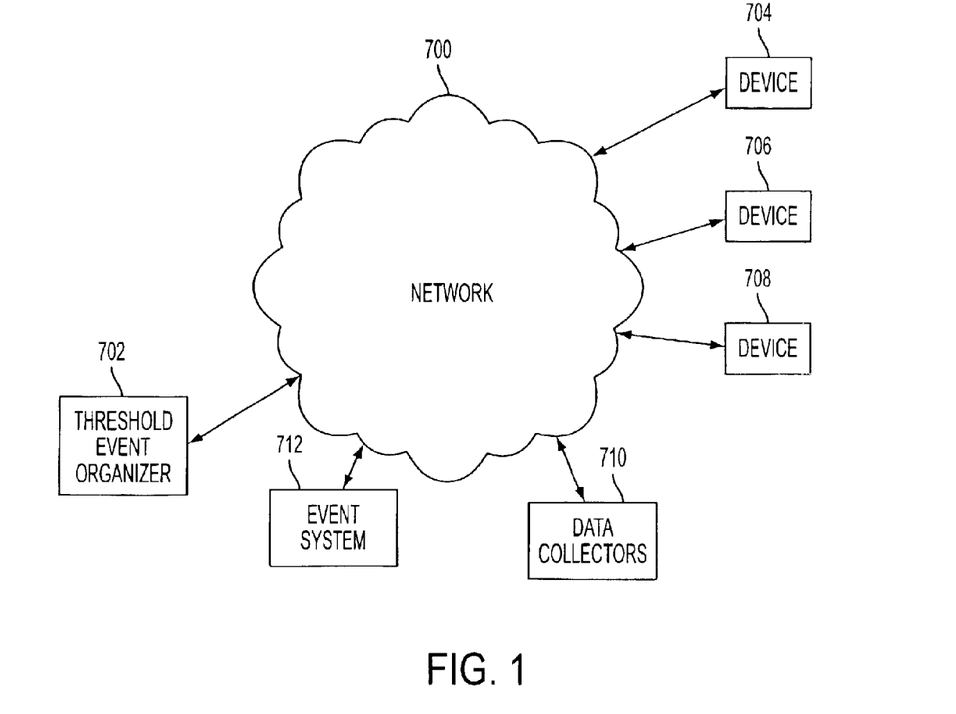
FIG. 1 is a diagram illustrating a network connected to a plurality of devices, a data collector, an event system, and a threshold event organizer, according to embodiments of the present invention.

FIG. 1 is a diagram illustrating a network connected to a plurality of devices, a data collector, an event system, and a threshold event organizer, according to embodiments of the present invention. Referring now to FIG. 1, network 700 may be any type of network, e.g., a LAN, WAN, switched, unswitched, ATM, ISDN, wireless, the Internet, etc. However, embodiments of the present invention are not limited thereto. For example, network 700 could be a switching mesh that directly connects connected devices. Devices 704, 706, and 708 are connected to network 700 and may be any type of network devices, e.g., a network element, a router, a switch, a PC, etc. For purposes of illustration, only three network devices are shown; however, embodiments of the present invention are not so limited. For example, there may be greater or fewer than three network devices connected to network 700. Devices 704–708 are controlled via a plurality of protocols, e.g., SNMP, XML, CMIP, etc. Data collectors 710 (illustrated as one unit, but not limited thereto) are connected to network 700, and they collect heterogeneous scalar measurement data from devices 704–708. Data collectors 710 are well-known in the art. Embodiments of the present invention are not limited to a particular number of data collectors. Threshold event organizer 702 is also connected to network 700, and normalizes the collected heterogeneous scalar measurement data based on a threshold to generate an event based on a threshold crossing. Event system 712 is also connected to network 700, and is a publish/subscribe system that publishes the event for access by subscribers.

Figure 2:
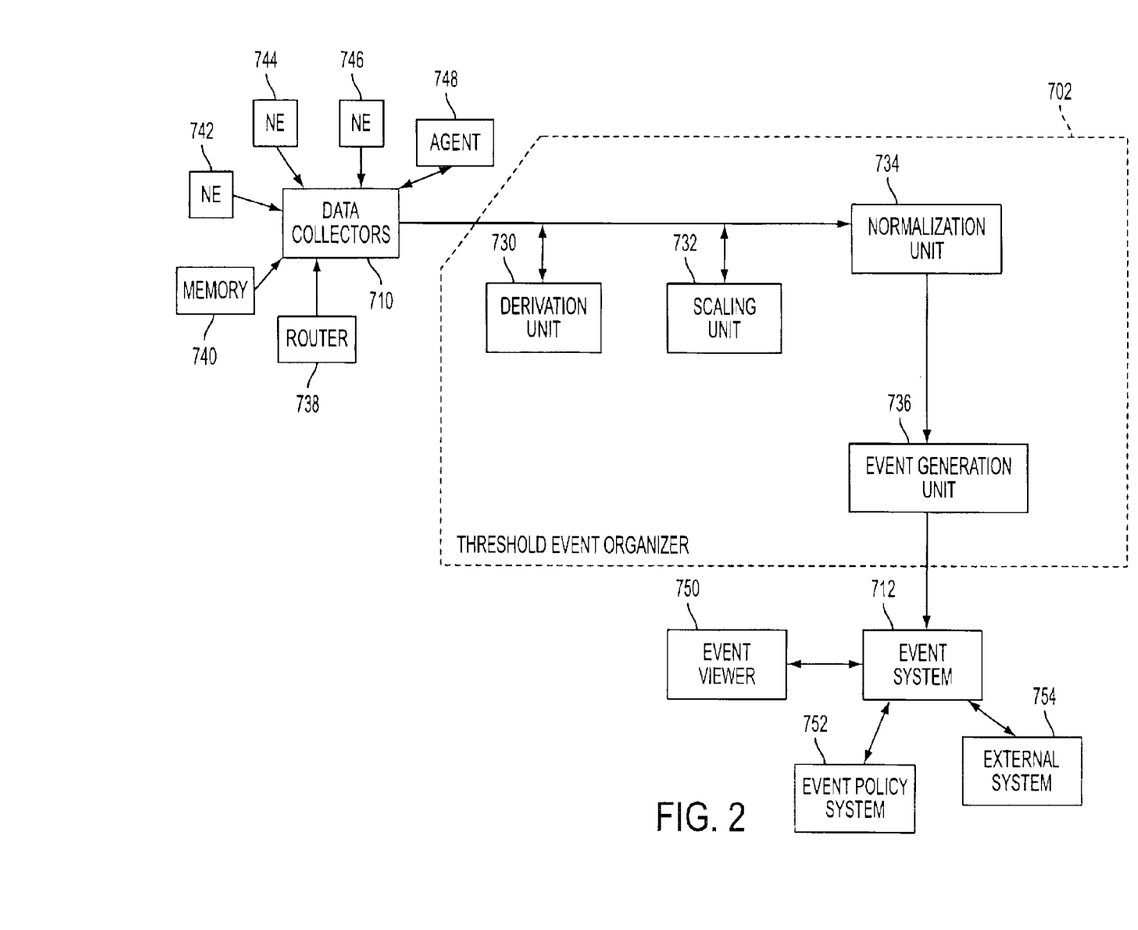
FIG. 2 is a diagram illustrating a more detailed view of the threshold event organizer, the data collector, and the event system, according to embodiments of the present invention.

FIG. 2 is a diagram illustrating a more detailed view of the threshold event organizer, the data collector, and the event system. Referring now to FIG. 2, threshold event organizer 702 is connected to data collectors 710 and event system 712 via network 700 (not shown). Data collectors 710 are connected to router 738, memory 740, network element (NE) 742, network element (NE) 744, network element (NE) 746, and agent 748 via network 700 (not shown); however, embodiments of the present invention are not limited to the devices shown. For example, data collectors 710 may be connected to any type of network device. Heterogeneous scalar measurement data is collected by data collectors 710 and is intervalized if necessary. For example, the collected heterogeneous scalar measurement data may be collected on cardinal time points, whereby the values would have to be subtracted from the previous value in order to get the measurement for that data interval. However, embodiments of the present invention are not limited to a specific intervalizing technique, as other intervalizing techniques can be used.

Threshold event organizer 702 includes, for example, derivation unit 730, scaling unit 732, normalization unit 734, and event generation unit 736. The collected heterogeneous scalar measurement data is derived by derivation unit 730 if data must be expressed in a different format. For example, if the collected heterogeneous scalar measurement data indicates bytes per second through router 738, that data may be derived by dividing by the speed of the router and applying appropriate factors for bits and byte diversion to get a percentage of utilization of the router. However, embodiments of the present invention are not limited to the previous example, as other derivations may occur. The collected heterogeneous scalar measurement data or the derived measurement is scaled by scaling unit 732 if the data needs to be converted into different units.

The network administrator determines a threshold for purposes of generating an event when the threshold is crossed. For example, in regard to utilization, where zero percent utilization is the best and one hundred percent utilization is the worst, the network administrator may set a threshold at thirty-three percent utilization. Embodiments of the present invention are not limited to the setting of one threshold, as a greater number of thresholds may be set. For example, the network administrator may set another threshold at sixty-six percent utilization. Normalization unit 734 automatically normalizes the collected heterogeneous scalar measurement data, the scaled derived measurement, the scaled collected heterogeneous scalar measurement data, or the derived measurement based on the threshold. In the embodiment with two thresholds discussed above, data might be normalized, for example, to be zero at zero percent utilization, 1 at thirty-three percent utilization, 2 at sixty-six percent utilization, and 3 at one hundred percent utilization. Data falling between the thresholds would be normalized accordingly, e.g., 1.5 at fifty percent utilization.

In an embodiment, the data is normalized by running the data through a function, where the following expression applies for the positive case (lower x is better):

$y=f(x)$ where $y=3.0$ where $x>=C\max$ $y=2.0+(x-Tyr)/(C\max-Tyr)$ where $C\max > x \geq Tyr$ $y=1.0+(x-Tgy)/(Tyr-Tgy)$ where $Tyr > x \geq Tgy$ $y=x/(Tgy-C\min)$ where $Tgy > x \geq C\min$ $y=0.0$ where $x < C\min$ In the RYG transform, x is the input to the transform function, y is the output thereof, Cmin is a minimum constraint value, Cmax is a maximum constraint value, Tyr is the second threshold expressed in the same units as the x value, and Tgy is the first threshold expressed in the same units as the x value. The expression may be modified for the negative case, where higher x is better, or composite cases where there are multiple positive and negative ranges within the input function. Embodiments of the present invention are not limited to the RYG transform, as other functions for normalizing the data may be used.

Event generation unit 736 determines whether any threshold crossings have occurred, and if so, generates an event accordingly. For example, in the above example, if the normalized data was 1.5, an event would be generated to indicate that utilization crossed the first threshold, i.e., greater than thirty-three percent. In another example, if the normalized data was 2.5, two events would be generated to indicate that the utilization crossed the first and second thresholds, i.e., greater than thirty-three and sixty-six percent. For each event, the source, type, severity, and direction are generated.

Event system 712 distributes the events as they occur by publishing them for access by subscribers. Event system 712 is connected to a plurality of subscribers, e.g., event viewer 750, event policy system 752, and external system 754 via network 700 (not shown); however, a greater or lesser number of subscribers may be connected to event system 712. Event viewer 750 displays the events to the network administrator. In an embodiment, event viewer 750 prints out a spreadsheet on paper; however embodiments of the present invention are not limited to printing out on paper. For example, in another embodiment, event viewer 750 displays a chart on a screen. In another embodiment, the chart is displayed in color (see discussion of FIG. 5 below). In a further embodiment, event viewer 750 displays events graphically on a time axis for correlation with other measurements, for example, network traffic, within a time domain. In another embodiment, event viewer 750 displays the total number of events within a specified time frame or frames. Event policy system 752 takes some predetermined action upon accessing an event. In an embodiment, event policy system 752 pages the network administrator to notify him of the event; however, embodiments of the present invention are not limited to paging the network administrator. For example, in another embodiment, event policy system 752 shuts down network 700. External system 754 exports the event to another network. In an embodiment, external system 754 triggers the sending of an SNMP packet to a user on another network; however, embodiments of the present invention are not limited to sending an SNMP packet.

The network administrator or other recipient of an event may, for example, get more information about the event by requesting the same from threshold event organizer 702. Threshold event organizer 702 would then reverse the normalization process on the data that triggered the event, allowing the network administrator or recipient to view the collected heterogeneous scalar measurement data.

Figure 3:
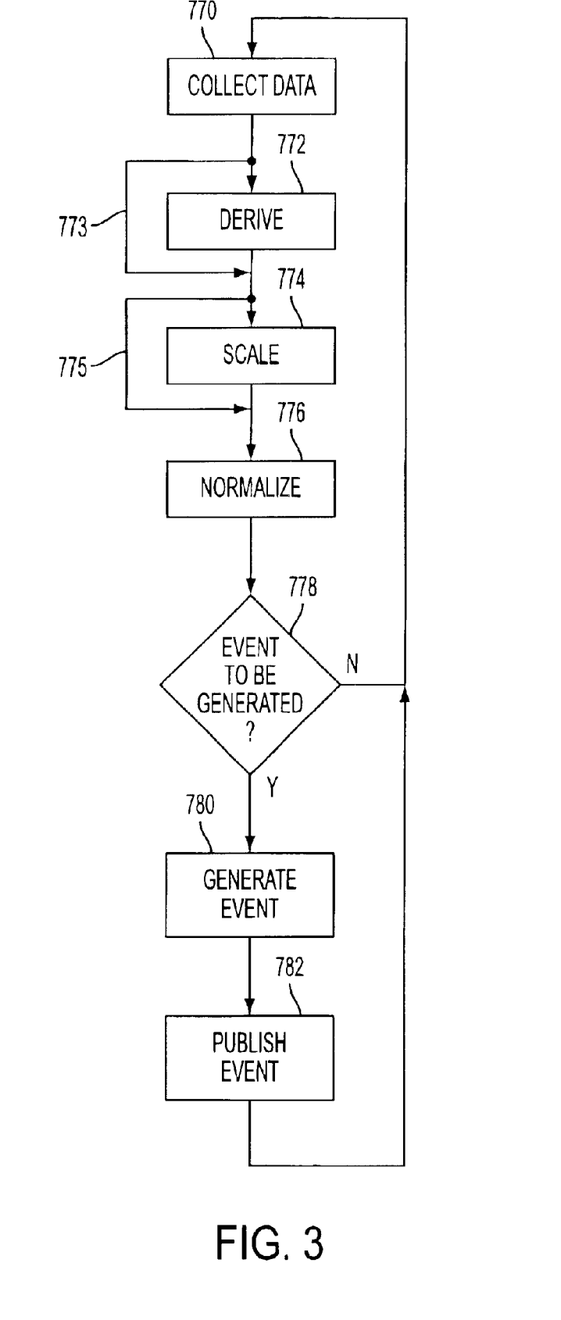
FIG. 3 is a flow diagram illustrating the flow of heterogeneous scalar measurement data through the system, according to embodiments of the present invention.
Figure 4:
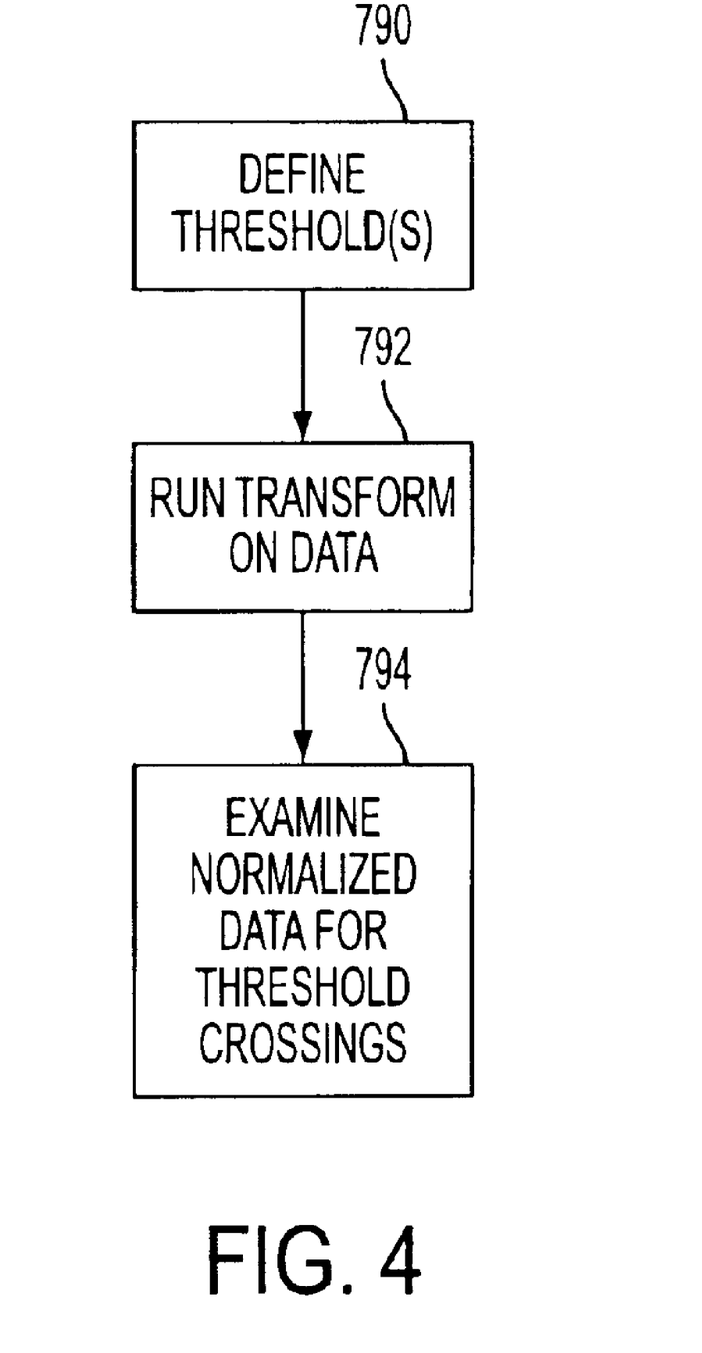
FIG. 4 is a flow diagram illustrating the normalization of data, according to embodiments of the present invention.

FIG. 3 is a flow diagram illustrating the flow of heterogeneous scalar measurement data through the system, according to embodiments of the present invention. Referring now to FIG. 3, in operation 770, heterogeneous scalar measurement data is collected. If the collected heterogeneous scalar measurement data needs to be intervalized, that is done during collection. In an embodiment, the collected heterogeneous scalar measurement data is automatically derived in operation 772. In another embodiment, nothing is derived from the collected heterogeneous scalar measurement data, and operation 772 is bypassed via branch 773. In an embodiment, the collected heterogeneous scalar measurement data, bypassing operation 772 via branch 773, is automatically scaled in operation 774. In another embodiment, the derived measurement is automatically scaled in operation 774. In a further embodiment, nothing is scaled, and operation 774 is bypassed via branch 775. The process moves to operation 776, where the collected heterogeneous scalar measurement data, the scaled derived measurement, the scaled collected heterogeneous scalar measurement data, or the derived measurement is normalized (FIG. 4 defines operation 776 in greater detail). From operation 776, the process moves to operation 778, where if an event is not to be generated, the process returns to operation 770 and thereby continues collecting and normalizing data. If an event is to be generated, the process moves to operation 780, where an event is generated in operation 780. From operation 780, the process moves to operation 782, where the generated event is published for access by subscribers. From operation 782, the process returns to operation 770.

FIG. 4 is a flow diagram illustrating the normalization of data in operation 776, according to embodiments of the present invention. Referring now to FIG. 4, in operation 790, the normalizing includes defining a threshold. As stated previously, the present invention is not limited to defining or normalizing for one threshold. From operation 790, the process moves to operation 792, where a transform is run on the normalized data (see discussion thereof in regard to FIG. 2). From operation 792, the process moves to operation 794, where the normalized data is examined for threshold crossings.

Figure 5:
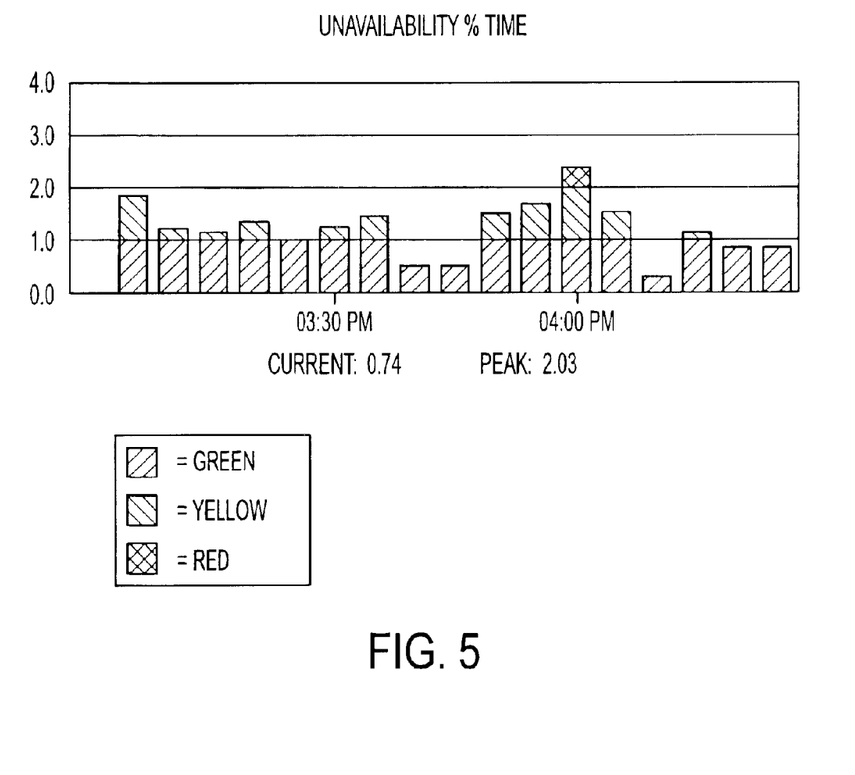
FIG. 5 is a diagram illustrating the display of normalized data in color, according to embodiments of the present invention.

FIG. 5 is a diagram illustrating the display of normalized data in color, according to embodiments of the present invention. As described in regard to FIG. 2, in an embodiment, event viewer 750 may display a color chart on a screen. Referring now to FIG. 5, a graph of the percentage of time that the network element is unavailable using two thresholds is illustrated. For example, there is a threshold at 1.0% and another threshold at 2.0%. In another embodiment, another threshold exists at 3.0%. However, the present invention is not limited to two or more thresholds, as there may be only one threshold in another embodiment. In addition, the present invention is not limited to displaying only percentage of time of unavailability, as any other measurement may be displayed. In an embodiment as illustrated in FIG. 5, event viewer 750 displays the normalized data as vertical display elements comprising different colors, depending on the value of the normalized data. For example, for normalized data that is below the first threshold, i.e., 1.0, green may be used; for normalized data that is at or above the first threshold, i.e., 1.0, but below the second threshold, i.e., 2.0, yellow may be used; for normalized data that is at or above the second threshold, i.e., 2.0, red may be used.

In FIG. 5, the leftmost vertical display element may be illustrated with two colors, for example: green and yellow. This indicates that the normalized data at that particular time crossed the first threshold, i.e., 1.0, but not the second threshold, i.e., 2.0. The rightmost vertical display element may be illustrated with only one color, for example: green. This indicates that the normalized data at that particular time did not cross any thresholds. The vertical display element at 04:00 PM may be illustrated with three colors, for example: green, yellow, and red. This indicates that the normalized data at that particular time crossed two thresholds, i.e., 1.0 and 2.0. In addition, event viewer 750 displays the current normalized data, i.e., 0.74, and the peak normalized data, i.e., 2.03. The current normalized data may be represented by the rightmost vertical display element, while the peak normalized data may be represented by the vertical display element at 04:00 PM.

Embodiments of the present invention are not limited to the combination of red, yellow, and green. For example, any other color or color combination may be used. Embodiments of the present invention are not limited to particular colors for particular threshold ranges. For example, red or any other color may be used for normalized data below the first threshold, i.e., 1.0. Embodiments of the present invention are not limited to changing color when the normalized data equals a threshold. For example, normalized data may be displayed as green when at or below the first threshold, i.e., 1.0. Embodiments of the present invention are not limited to displaying normalized data in multiple colors per vertical display element. For example, in the leftmost vertical display element, the present invention could be configured to display normalized data that has not yet crossed the second threshold, i.e., 2.0, in one color instead of two. Embodiments of the present invention are not limited to a graph on X and Y axes using vertical display elements. For example, a color spreadsheet or scatter plot may be used. Embodiments of the present invention are not limited to displaying only one type and set of measurements at a time. For example, multiple graphs may be displayed on the same screen, each graph representing a different type and set of measurements, thresholds, etc.

The network, network devices, data collectors, threshold event organizer, event system, and subscribers included in the system may include, for example, memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media; optical storage media, flash memory devices, electrical, optical, acoustical, or other form of propagated signals (e.g., carrier waves, infrared signals, digital signals, etc.), etc.

As indicated above, various procedures are performed "automatically," which indicates that the operation is performed in an automated manner by a computer, and intervention by the network administrator is not required.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for organizing threshold events, comprising:
   collecting heterogeneous scalar measurement data over a network from a plurality of devices connected to the network;
   automatically normalizing the collected heterogeneous scalar measurement data; and
   running a transform function utilizing a first threshold, a second threshold, a minimum constraint value and a maximum constraint value on the normalized data to thereby generate events based on threshold crossings.

2. The method of claim 1, further comprising:
   automatically displaying the normalized data, after having been transformed by the transform function, in color such that a first color is used for the range of values above and including the first threshold and a second color is used for a range of values below the first threshold.

3. The method of claim 1, wherein the collecting comprises:
   automatically intervalizing the heterogeneous scalar measurement data.

4. The method of claim 1, further comprising:
   automatically deriving a measurement from the collected heterogeneous scalar measurement data; and
   automatically scaling the derived measurement or the collected heterogeneous scalar measurement data.

5. The method of claim 4, wherein the normalizing normalizes the collected heterogeneous scalar measurement data, the scaled derived measurement, the scaled collected heterogeneous scalar measurement data, or the derived measurement.

6. The method of claim 1, further comprising:
   automatically distributing the event.

7. The method of claim 6, wherein the distributing comprises:
   automatically publishing the event to a publish/subscribe system; and
   automatically making the published event available to a subscriber.

8. The method of claim 7, wherein the subscriber is an event viewer, an event policy system, or an external system.

9. An apparatus to organize threshold events, comprising:
   a plurality of data collectors to collect heterogeneous scalar measurement data from a plurality of network devices;
   a derivation unit to derive a measurement from the collected heterogeneous scalar measurement data;
   a scaling unit to scale the derived measurement or the collected heterogeneous scalar measurement data;
   a normalization unit to normalize the scaled derived measurement, the scaled collected heterogeneous scalar measurement data, the derived measurement, or the collected heterogeneous scalar measurement data, to thereby produce normalized data; and
   running a transform function utilizing a first threshold, a second threshold, a minimum constraint value and a maximum constraint value on the normalized data, to thereby generate transformed data; and
   an event generation unit to generate events based on the transformed data when the first and second thresholds are crossed.

10. The apparatus of claim 9, further comprising:
    an event system to publish the event; and
    a subscriber, to access the published event, wherein the subscriber is an event viewer, an event policy system, or an external system.

11. A machine-readable medium that provides instructions for organizing threshold events, which, when executed by a machine, cause the machine to perform operations comprising:
    collecting heterogeneous scalar measurement data over a network from a plurality of devices connected to the network; and
    automatically normalizing the collected heterogeneous scalar measurement data; and
    running a transform function utilizing a first threshold, a second threshold, a minimum constraint value and a maximum constraint value on the normalized data, to thereby generate events based on threshold crossings.

12. The machine-readable medium of claim 11, further comprising:
    automatically displaying the normalized data, after having been transformed by the transform function, in color such that a first color is used for the range of values above and including the first threshold and a second color is used for a range of values below the first threshold.

13. The machine-readable medium of claim 11, wherein the collecting comprises:
    automatically intervalizing the heterogeneous scalar measurement data.

14. The machine-readable medium of claim 11, further comprising:

automatically deriving a measurement from the collected heterogeneous scalar measurement data; and automatically scaling the derived measurement or the collected heterogeneous scalar measurement data.

15. The machine-readable medium of claim 14, wherein the normalizing normalizes the collected heterogeneous scalar measurement data, the scaled derived measurement, the scaled collected heterogeneous scalar measurement data, or the derived measurement.

16. The machine-readable medium of claim 11, further comprising:

automatically distributing the event.

17. The machine-readable medium of claim 16, wherein the distributing comprises:

automatically publishing the event to a publish/subscribe system; and automatically making the published event available to a subscriber.

18. The machine-readable medium of claim 17, wherein the subscriber is an event viewer, an event policy system, or an external system.

19. An apparatus to organize threshold events, comprising:

means for collecting heterogeneous scalar measurement data from a plurality of network devices;

means for deriving a measurement from the collected heterogeneous scalar measurement data;

means for scaling the derived measurement or the collected heterogeneous scalar measurement data;

means for normalizing the scaled derived measurement, the scaled collected heterogeneous scalar measurement data, the derived measurement, or the collected heterogeneous scalar measurement data, to thereby produce normalized data; and means for running a transform function utilizing a first threshold, a second threshold, a minimum constraint value and a maximum constraint value on the normalized data, to thereby produce transformed data; and means for generating events based on the transformed data when the first and second thresholds are crossed.

20. The apparatus of claim 19, further comprising:

means for publishing the event; and means for accessing the published event.

* * * * *